United States Patent [19]

Tuomaala

[11] 4,240,315
[45] Dec. 23, 1980

[54] CIRCULAR SAW BLADE

[75] Inventor: Jorma Tuomaala, Karhula, Finland

[73] Assignee: A. Ahlstrom Osakeyhtio, Noormarkku, Finland

[21] Appl. No.: 10,370

[22] Filed: Feb. 8, 1979

[30] Foreign Application Priority Data

Feb. 16, 1978 [FI] Finland .................................. 780507

[51] Int. Cl.³ .............................................. B27B 33/08
[52] U.S. Cl. ......................................... 83/848; 83/835
[58] Field of Search .................................. 83/835–855

[56] References Cited

U.S. PATENT DOCUMENTS

| 191,198 | 5/1877 | Tilton | 83/835 |
| 1,711,102 | 4/1929 | Sierra, Jr. | 83/853 X |
| 3,700,016 | 10/1972 | Strobel | 83/848 |

FOREIGN PATENT DOCUMENTS

| 1050987 | 2/1959 | Fed. Rep. of Germany . | |
| 184359 | 8/1936 | Switzerland | 83/835 |

Primary Examiner—J. M. Meister
Attorney, Agent, or Firm—Bucknam and Archer

[57] ABSTRACT

A circular saw blade is divided into sectors through slots extending from the periphery toward the hub part so that adjacent sectors have appreciably different natural frequencies. The sectors damp one another's vibration so that the blade's function is stabilized.

2 Claims, 5 Drawing Figures

CIRCULAR SAW BLADE

BACKGROUND OF THE INVENTION

The present invention relates to a circular saw blade the periphery of which has been slotted so that the expansion of the peripheral part occurring when it warms up does not substantially change the state of tension of the blade.

The requirement for a satisfactory sawing result is that the circular saw blade maintains its plane shape and position on the entire range of operation even when its teeth have lost some of their sharpness. When necessary, the rigidity of the blade can be increased by thickening it or by applying suitable guiding means which alter the support of the blade so that the deformations caused by peripheral load are insignificant.

However, the greatest difficulty in handling the blade is caused by its liability to vibrate. The resonance frequencies which approach the rotational frequency of the blade are particularly dangerous. By stretching the centre section of the blade, that is by subjecting it to tension, the tangential stress of the outer periphery can be increased and thus the vibration frequencies can be transferred to a higher, safer range.

The stretching of a circular saw blade requires skill. The stretching must be adjusted to the drive speed, the friction caused by the guiding means and the peripheral load. The suitable degree of stretching can be found only by experimenting. The periphery expands due to the warming up of the peripheral portion of the blade which reduces the effect of stretching. The warming up occurs unevenly and depends on the degree of bluntness of the cutting teeth and the quality of the timber. The splinters pressed between the blade and the sawing slot and the saw dust leaking through the slots between the cutting teeth, in particular, cause rapid changes in the temperature of the periphery. Consequently, the blade may begin to vibrate at too high an amplitude which causes it to diverge from the sawing direction. This uncertainty diminishes the applicability of stretched circular saw blades provided with guiding means to multi-blade circular saws, in which saw type the divergence of one single blade stops the sawing operation and the great number of blades increases the number of breaks.

The actual shape of a stretched circular saw blade is difficult to measure. Thus during sawing a blade subjected to load has a different state of balance than what was intended when the setting was carried out. The deviation can exceed 1 mm in big blades. The local warming up of the blade changes its state of balance repeatedly. This phenomenon is particularly detrimental to double-shaft constructions in which the blades on both shafts should be in line.

SUMMARY OF THE INVENTION

The idea of trying to prevent a circular saw blade from warming up by slotting the periphery (FIG. 1) is not a new one.

The effectiveness of this procedure is dependent on the depth of the slots. When the slots are deep the sections between them form cantilevers which constitute a vibration system, the resonance of which rapidly increases whereby the vibration amplitude becomes intolerably high. If the vibration can be kept on an acceptable level the state of balance of the blade remains the same as was intended when the setting was done. The blade is not sensitive to local heat buildups. The optimum value has been achieved by limitting the depth of the slots to 30% of the greatest sawing height. Better stability can also be achieved by increasing the diameter of the blade drum in relation to the outer diameter of the saw blade.

To improve directional stability the slots would have to be deepened. This is made possible by the blade according to the invention which has been slotted so that the adjacent sectors, defined by the slots, have appreciably different natural frequencies.

BRIEF DESCRIPTION OF THE DRAWINGS

The invention is described in detail in the following with references to the annexed drawings of which.

DESCRIPTION OF THE PREFERRED EMBODIMENTS

Figure 1:
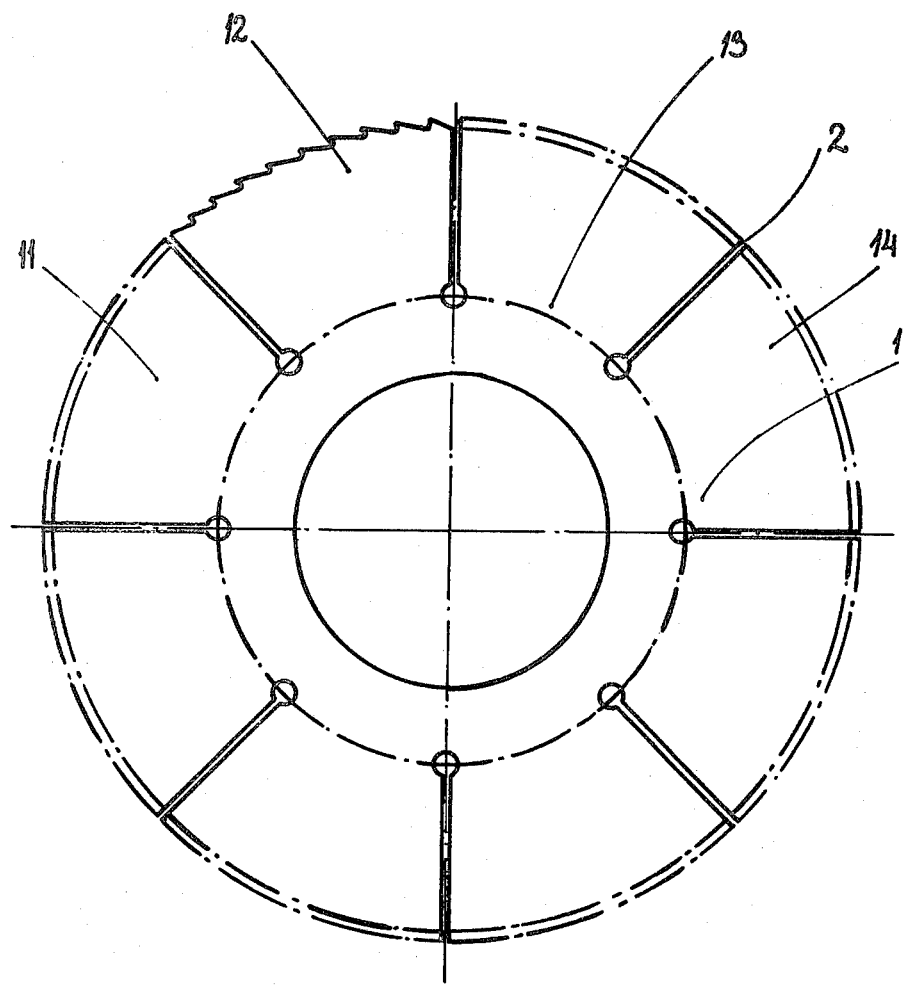
FIG. 1 shows a previously known circular saw blade.

In the drawings, number 1 refers to the blade of a circular saw which has been divided into sectors through slots 2. In the blade shown in FIG. 1 all sectors 11–18 are similar and they have the same natural frequency.

Figure 2:
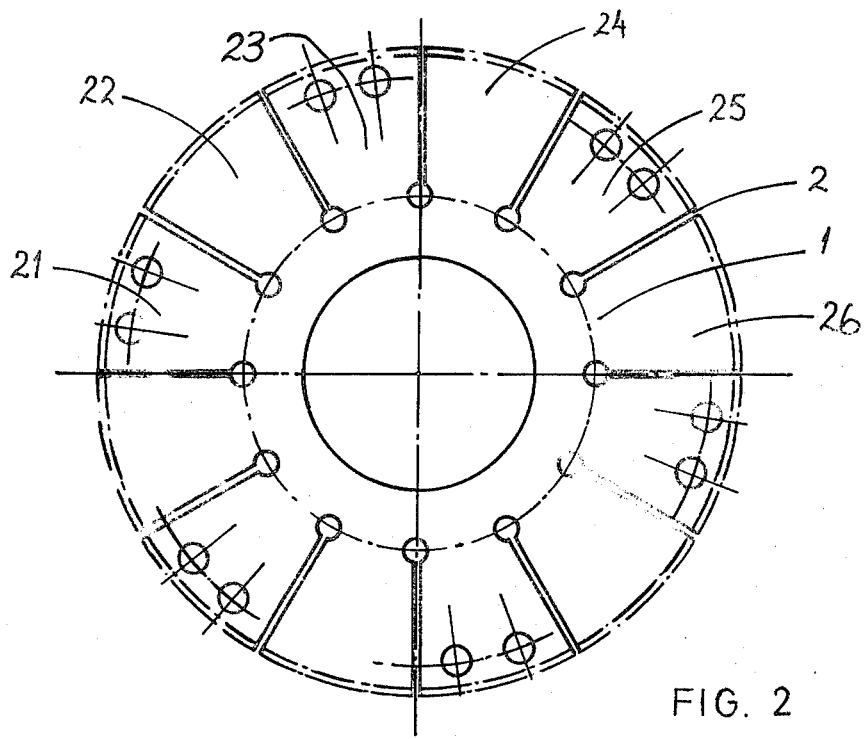
FIG. 2 shows an embodiment of the invention.
Figure 3:
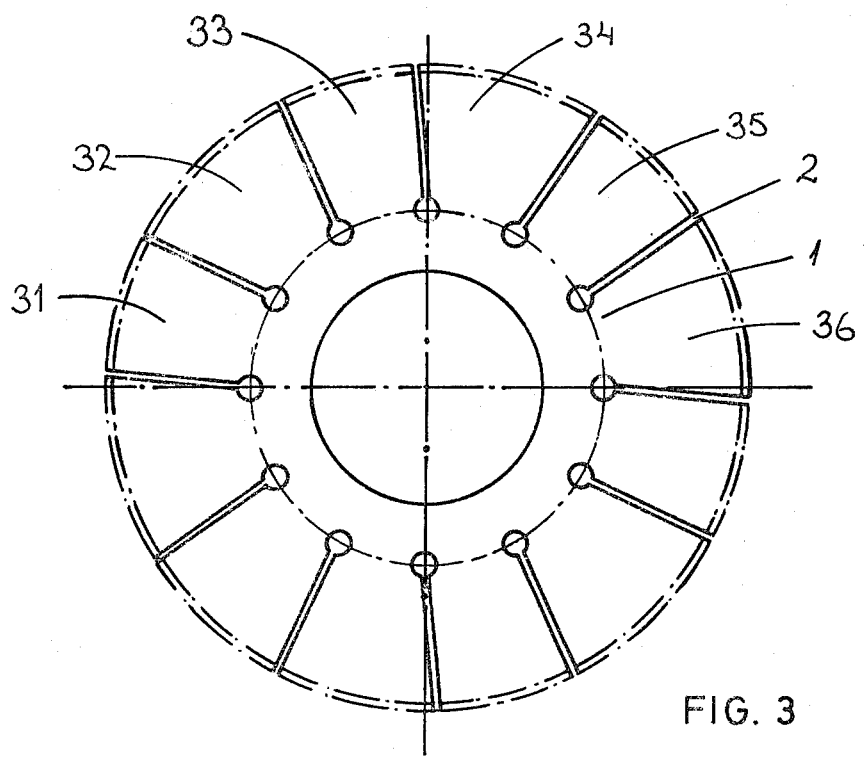
FIGS. 3, 4 and 5 show a number of alternative embodiments.

Sectors 21, 23 and 25 of the blade shown in FIG. 2 have higher natural frequencies than sectors 22, 24 and 26. This fact has been brought about by reducing the weight of the sectors through holes. In FIG. 3 the weight and the natural frequencies of sectors 31, 33 and 35 are made to differ from those of sectors 32, 34 and 36 by positioning the slots so that the outer peripheries of the sectors are of different length.

The blade vibrations are coupled to each other through the unslotted section of the blade between the hub and the sectors. When the adjacent sectors have different natural frequencies they disturb one another and thus the vibration is damped in a fraction of the time it would take if the adjacent sectors had the same natural frequency. Due to this method the slots can be made deeper than when applying the conventional technique and their heat stabilizing effect can be improved as well.

Furthermore, it becomes obvious that during sawing the sectors having lower frequencies are brought into resonance and their amplitude becomes too high. If so, the vibration of sector 22 (32) has been coupled directly to the vibration of sector 24 (34), 26 (36) etc. This can be prevented by extending every other slot to the hub part of the blade or close to it in a manner presented in FIG. 4. In this embodiment sectors 41 and 42 damp each other but their vibration does not propagate to the following sector pair 43, 44 etc. in any form. The disadvantage of this construction is the decrease of the lateral rigidity in small-hubbed blades due to the deep slots.

Figure 4:
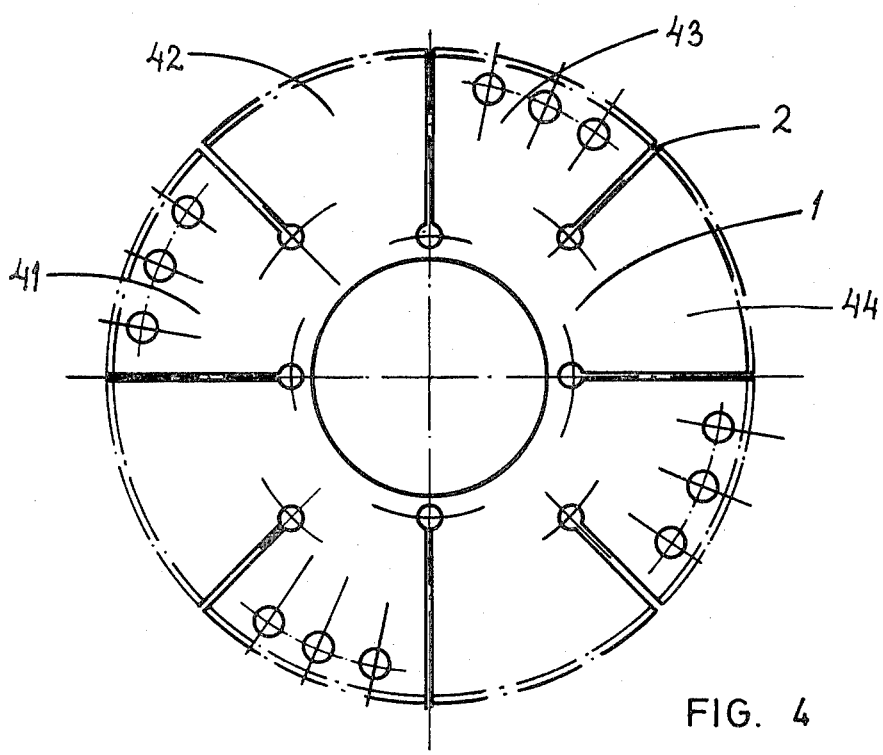
Figure 5:
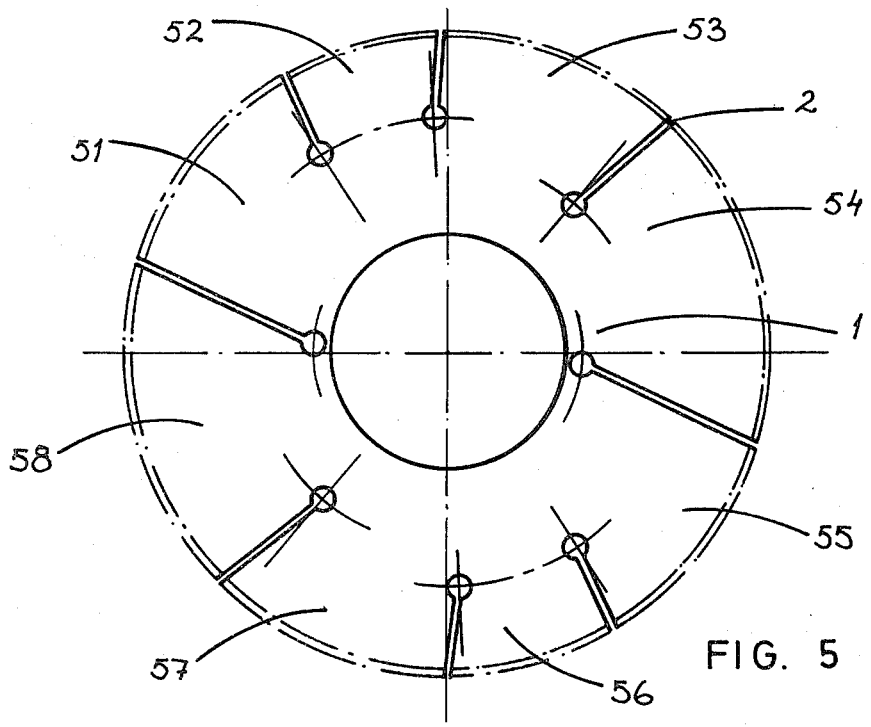

The embodiment according to FIG. 4 is applicable when the diameter of the blade drum is large in relation to the outer diameter of the blade, ie over 60%. In constructions having a smaller hub the idea can be developed further in a manner presented in FIG. 5. In this embodiment the blade is divided into two similar sections through slots extending to the hub part. These slots break the vibration coupling between the two sections. Both sections are divided into 4 sectors through slots of different depth, having their own natural frequencies. The natural frequencies in an embodiment which was examined were:

sectors 51 and 55, 174 Hz
sectors 52 and 56, 484 Hz
sectors 53 and 57, 267 Hz
sectors 54 and 58, 110 Hz In practice the blade performs well. When all sectors in both halves have a different natural frequency, the damping of any sector liable to vibrate becomes efficient due to the natural frequencies of the other sectors. The possibility of the vibration spreading to the other half was prevented through sufficiently deep slots.

What we claim is:

1. A circular saw blade divided into two sections by means of two radial slots which extend from the periphery of the blade inwardly almost to the eye of the blade, and each section of the blade is further divided into a plurality of sectors by means of radial slots of different length, two adjacent sectors having a different size, different weight, and different natural frequency.

2. The saw blade according to claim 1 wherein each section is divided into four sectors by means of three radial slots.

* * * * *